Jan. 20, 1931.   H. E. LARINAN   1,789,527
POTATO HARVESTER
Filed June 25, 1928   3 Sheets-Sheet 3

H.E.Larinan,
INVENTOR
BY Victor J. Evans
ATTORNEY

Patented Jan. 20, 1931

1,789,527

UNITED STATES PATENT OFFICE

HARRY E. LARINAN, OF FOLEY, ALABAMA

POTATO HARVESTER

Application filed June 25, 1928. Serial No. 288,067.

This invention relates to a potato harvester which is mainly designed for harvesting sweet potatoes and which is adapted to be attached to a digger so as to receive the potatoes and vines from the same, the general object of the invention being to provide means for removing the potatoes from the vines and for separating the potatoes from the vines and conveying the potatoes to an endless belt which is so arranged as to separate the potatoes from clods of earth and the like and to direct them into a sack.

Another object of the invention is to provide a deflector member on the belt for directing the potatoes into either one of two sacks according to the adjustment of said member.

A still further object of the invention is to provide means for driving the movable parts of the device by one of the ground wheels of said device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 4 is a section on line 4—4 of Figure 1.

Figure 1:
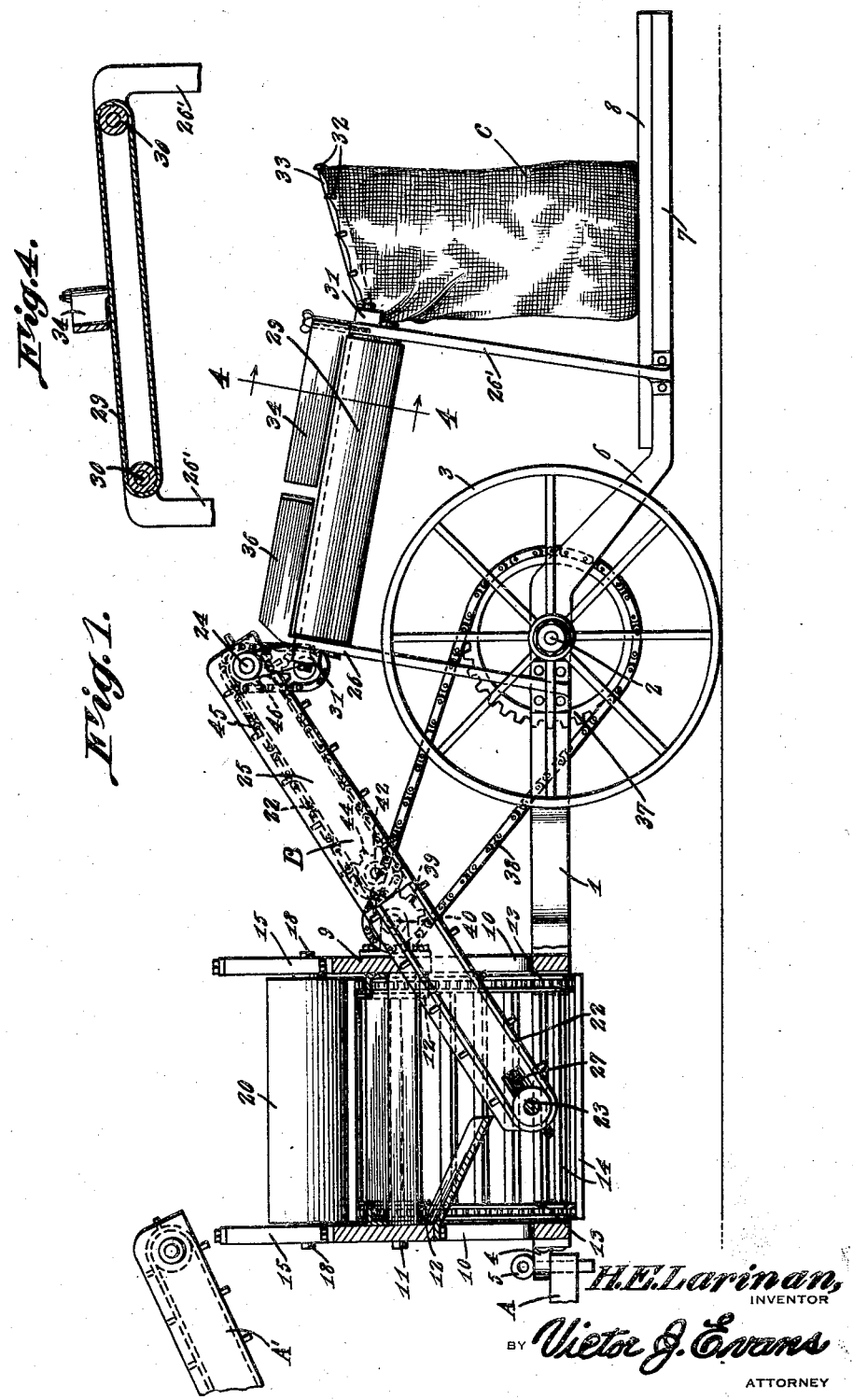
Figure 1 is a vertical sectional view with parts in elevation.

In these views, the numeral 1 indicates the main frame of the device which is supported substantially at its center by the axle 2 which carries the wheels 3, a clevis 4 being fastened to the front part of the frame at the center thereof so that the frame can be pivotally connected to the rear part of a digger, portions of which are shown at A, by the pin 5. The frame is formed with a rearwardly and downwardly sloping part 6 behind the axle and a platform supporting part 7 is connected at its front end with this part 6 so that the platform 8 is in a lower plane than the front part of the frame.

Figure 3:
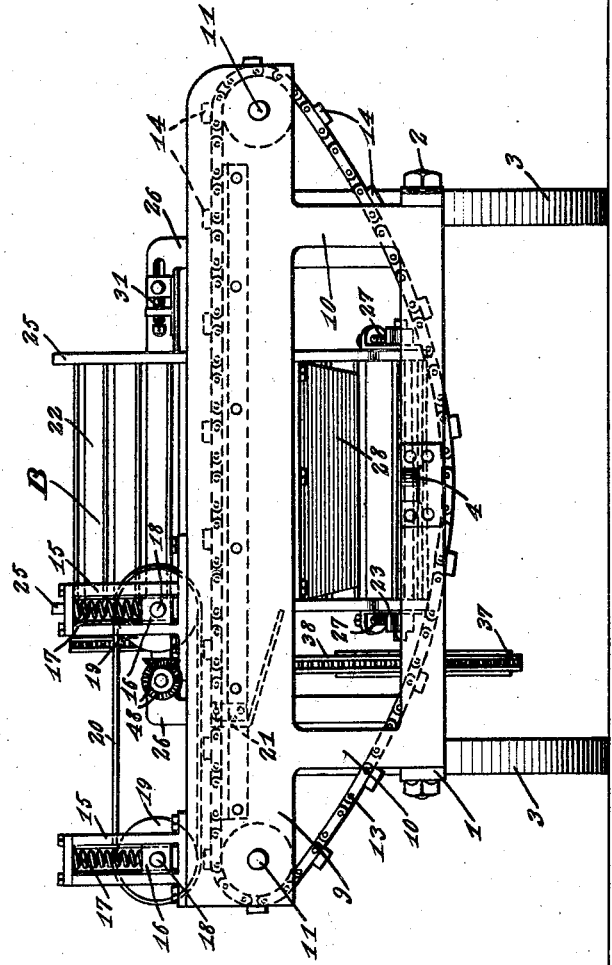
Figure 3 is a front view.

A transversely and horizontally arranged conveyor frame 9 is supported from the front part of the frame 1 by the uprights 10 and a shaft 11 is journaled in each end of the frame 9 and carries the sprockets 12. Endless chains 13 pass over the sprockets and the chains are connected together by the slats or cross pieces 14. As shown in Figure 3, the chains are of such a length that the lower reach of each chain will form itself into a loop, the central portion of which extends below the main frame. The frame 9 and the chains with their slats are so arranged as to receive the potatoes and vines falling from the elevator A' of the digger.

Figure 2:
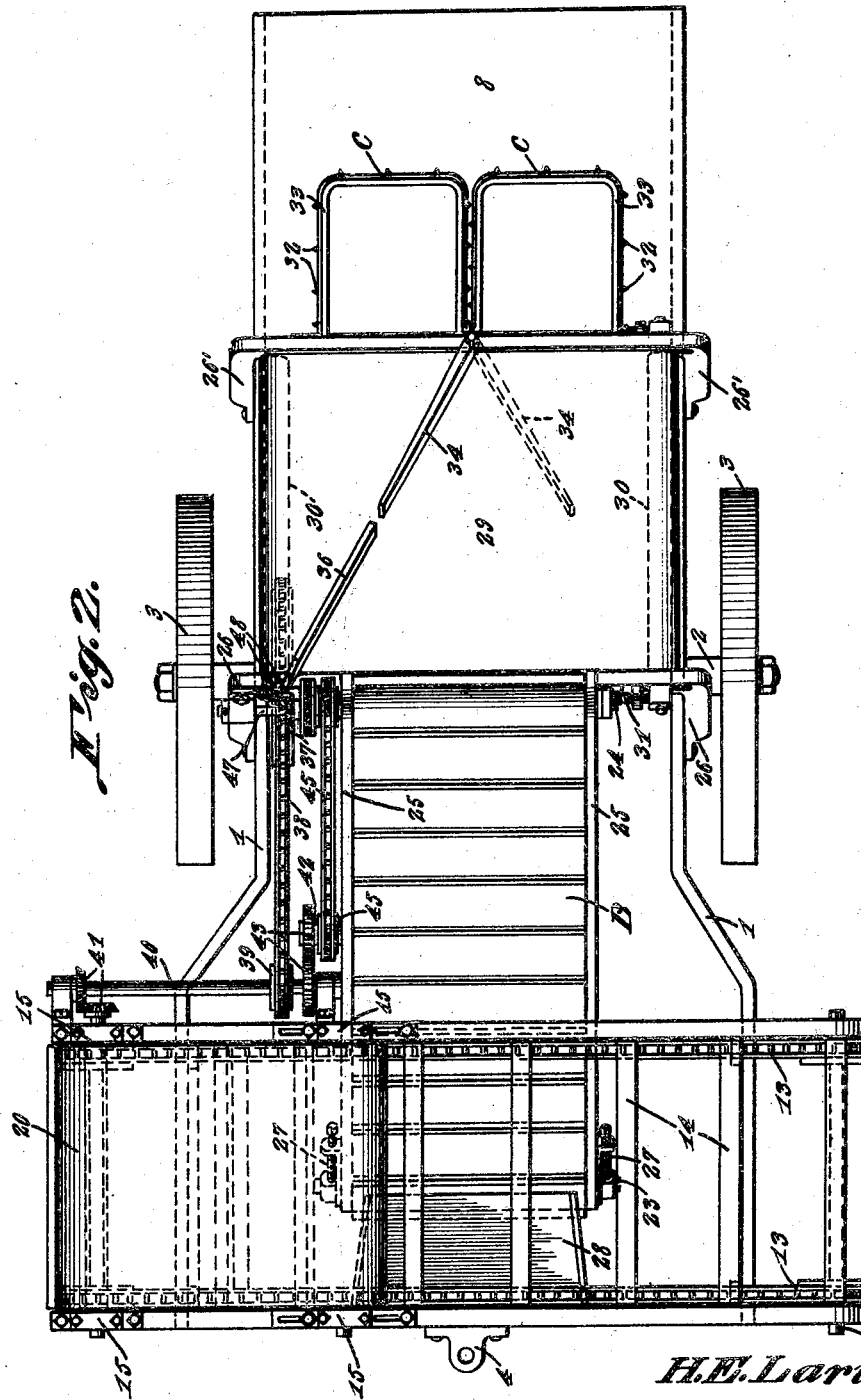
Figure 2 is a plan view.

Slotted uprights 15 are fastened to the side pieces of the frame 9, a pair of these uprights being arranged at the rear end of the frame 9 and another pair adjacent the center thereof and a bearing member 16 is slidably arranged in each upright, and each bearing member is yieldingly held in its lowest position by a spring 17 arranged in the upright. Pintles 18 of rollers 19 are journaled in the bearing members and an endless belt 20 passes over these rollers with the lower reach of the belt in contact with the slats 14 so that the belt 20 will be caused to move with the conveyor formed by the chains 13 and the slats 14 through friction. The inner roller 19 is so placed that the potatoes and vines falling from the conveyor of the digger will drop upon the slats 14 in front of the said roller and the potatoes will drop through the spaces between the slats, the vines being held by the slats. Then as the conveyor moves along, the vines pass under the belt and the potatoes will strike a cross bar 21 which acts to pull the potatoes from the vines, the vines continuing along with the conveyor until they are discharged as the conveyor passes downwardly over the rear sprockets and the potatoes will drop upon an elevator B which is composed of the endless belt 22, the upper and lower rollers 23 and 24 and the side pieces 25. The lower end of the elevator is suitably supported on the front part of the frame 1 under the central portion of the conveyor frame 9 and the upper end is supported by the uprights 26. The lower roller 23 has its journals adjustably supported through the means shown generally at 27 and a chute 28 directs the potatoes falling from the front part of the conveyor in the frame 9 on to the elevator. An endless belt 29 is supported on the rollers 30, the pintles of which are journaled in the uprights 26 and the uprights 26', one roller having its pintles adjustable through the means which are generally shown at 31. The uprights 26 and 26' extend upwardly and rearwardly, as shown in Figure 1, so that the belt slopes from its front edge toward its lower edge and the left hand roller 30 is arranged in a plane higher than the plane of the right hand roller so that the belt slopes upwardly in the direction of the travel of its upper part. The elevator B is so arranged as to deposit the potatoes traveling up the same upon the front portion of this belt so that the potatoes will roll down the same toward the rear end of the machine as they travel from left to right along the blade. Thus any clods of earth or the like will move along with the belt and drop off the upper end of the same, while the potatoes will roll down the belt under the action of gravity and drop off the rear edge of the belt into a sack C having its lower end resting upon the platform 8 and its upper end engaging the hooks 32 on a frame 33 attached to the uprights 26'. As shown in Figure 2, I provide two of these frames for supporting two sacks so that one sack can be removed after it is filled, while the potatoes are being discharged into the other sack. In order to direct the potatoes into one sack or the other, I provide an adjustable deflector member 34 which is pivoted at its rear end to a cross piece 35 forming a part of the uprights 26' so that this member can be moved from the full line position to the dotted line position shown in Figure 2 to direct the potatoes into either sack. A second deflector member 36 is arranged to extend over a portion of the belt at the right-hand end thereof to prevent the potatoes passing from this end of the belt, this deflector being in alignment with the deflector 34 when said deflector 34 is in its right hand position.

A sprocket 37 is attached to the axle 2 and a chain 38 passes over this sprocket and over a sprocket 39 and a shaft 40 which is journaled in the rear part of the frame 9 and this shaft is connected with one of the pintles of the right hand shaft 11 by the gears 41 so that the conveyor in the frame 9 is driven from the axle as the device travels along.

A stub shaft 42, carried by one of the side pieces 25 of the elevator B is connected with the shaft 40 by the gears 43 and a sprocket 44 is fastened to this stub shaft. A chain 45 passes over this sprocket 44 and over a sprocket 46 fastened to the upper shaft of the conveyor B so as to operate this elevator and said shaft is extended, as shown at 47, and is connected with the pintle of the right hand roller 30 of the belt 29 by the gears 48 so that the belt is driven from the axle.

From the foregoing it will be seen that I have provided means for removing the potatoes from the vines and elevating the potatoes to a separator which separates clods of dirt and the like from the potatoes and deposits the potatoes into sacks as the digger and the device travel along.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

In a potato harvester, a vine stripping mechanism comprising an inclined frame, an endless conveyor mounted for travel therein and including endless chains and slats extending transversely between the chains, rollers mounted in the frame for rotation, an endless belt trained about the rollers and having its lower stretch in contact with the slats at the upper stretch of the conveyor, the said belt being caused to travel by its frictional contact with the said slats, the slats being so spaced as to permit the potatoes, deposited on the conveyor, to drop between the slats as the vines are carried between the lower conveyor stretch and the inner one of the rollers, the slats constituting means for conducting the vines, and a bar arranged transversely beneath the upper stretch of the conveyor for engagement by the potatoes to effect their detachment from the vines.

In testimony whereof I affix my signature.

HARRY E. LARINAN.